(12) United States Patent
Chan et al.

(10) Patent No.: US 12,353,615 B2
(45) Date of Patent: Jul. 8, 2025

(54) SYSTEM FOR NAVIGATING A VIRTUAL ENVIRONMENT USING SEATED WALKING-IN-PLACE FOOTSTEP LOCOMOTION

(71) Applicant: National Yang Ming Chiao Tung University, Hsinchu (TW)

(72) Inventors: Li-Wei Chan, New Taipei (TW); Tzu-Wei Mi, Taichung (TW); Chung-Hao Hsueh, Tianwei Township (TW); Yi-Ci Huang, Hsinchu (TW)

(73) Assignee: NATIONAL YANG MING CHIAO TUNG UNIVERSITY, Hsinchu (TW)

( * ) Notice: Subject to any disclaimer, the term of this patent is extended or adjusted under 35 U.S.C. 154(b) by 0 days.

(21) Appl. No.: 18/653,294

(22) Filed: May 2, 2024

(65) Prior Publication Data

US 2025/0044859 A1 Feb. 6, 2025

(30) Foreign Application Priority Data

Aug. 4, 2023 (TW) ................ 112129381

(51) Int. Cl.
*G06F 3/01* (2006.01)
(52) U.S. Cl.
CPC .................. *G06F 3/011* (2013.01)
(58) Field of Classification Search
CPC ................ G06F 3/011; G06T 13/40
USPC .............................. 434/247; 482/8
See application file for complete search history.

(56) References Cited

U.S. PATENT DOCUMENTS

2007/0003915 A1* 1/2007 Templeman ............ G06T 13/40
434/247
2011/0009241 A1* 1/2011 Lane ...................... G06F 3/011
482/8

OTHER PUBLICATIONS

Balderas et al., "A Makerspace Foot Pedal and Shoe Add-On for Seated Virtual Real-ity Locomotion," 2019 IEEE 9th International Conference on Consumer Elec-tronics (ICCE-Berlin), Berlin, Germany, 2019, pp. 275-280, doi: 10.1109/ICCE-Berlin47944.2019.8966197.
Chan et al., "Seated-Walking: A Walking-in-Place Technique for Seated VR," CBE—SIGGRAPH '23, Jul. 23, 2023 , Immersive Pavilion, total 2 pages.

(Continued)

*Primary Examiner* — Abdul-Samad A Adediran
(74) *Attorney, Agent, or Firm* — Birch, Stewart, Kolasch & Birch, LLP

(57) ABSTRACT

A system for navigating a virtual environment using seated walking-in-place footstep locomotion includes a virtual reality device, a first sensing device, and a second sensing device. The first sensing device senses the first footstep locomotion of one of feet of a user seated in a physical environment to generate and transmit a first stepping signal to the virtual reality device. The second sensing device senses the second footstep locomotion of another of the feet of the user seated in the physical environment to generate and transmit a second stepping signal to the virtual reality device. The virtual reality device navigates the virtual environment in a virtual locomotion mode based on a combination of the first stepping signal and the second stepping signal.

31 Claims, 13 Drawing Sheets

(56) References Cited

OTHER PUBLICATIONS

Freiwald et al., "Walking by Cycling: A Novel In-Place Locomotion User Interface for Seated Virtual Reality Experiences", 2020 CHI Conference on Hu-man Factors in Computing Systems (CHI '20), Association for Computing Ma-chinery, New York, NY, USA, pp. 1-12, <https://doi.org/10.1145/3313831.3376574>.
Kitson et al., "NaviChair: Evaluating an Embodied Interface Using a Point-ing Task to Navigate Virtual Reality", in Proceedings of the 3rd ACM Symposium on Spatial User Interaction (SUI '15), Association for Computing Machin-ery, New York, NY, USA, 2015, pp. 123-126,<https://doi.org/10:1145/2788940.2788956>.
Marchal et al., "Joyman: A human-scale joystick for navigating in virtual worlds," 2011 IEEE Symposium on 3D User Interfaces (3DUI), Singapore, 2011, pp. 19-26, doi: 10.1109/3DUI.2011.5759212.
Tregillus et al., "Handsfree Omnidirectional VR Navigation using Head Tilt", in Proceedings of the 2017 CHI Conference on Human Factors in Computing Systems (CHI '17), Association for Computing Machinery, May 2017, New York, NY, USA, pp. 4063-4068; <https://doi.org/10.1145/3025453.3025521>.
Wilson et al., "VR locomotion: walking > walking in place > arm swinging", in Proceedings of the 15th ACM SIGGRAPH Conference on Virtual-Reality Continuum and Its Applications in Industry—vol. 1 (VRCAI '16), Association for Computing Machinery, New York, NY, USA, 2016, pp. 243-249.<https://doi.org/10.1145/3013971.3014010>.
Zhang et al., "Perch to Fly: Embodied Virtual Reality Flying Locomotion with a Flexible PerchingStance", in Proceedings of the 2019 on Designing Interactive Systems Conference (DIS '19), Association for Computing Machinery, Jun. 2019, New York, NY, USA, pp. 253-264, <https://doi.org/10.1145/3322276.3322357>.

\* cited by examiner

SYSTEM FOR NAVIGATING A VIRTUAL ENVIRONMENT USING SEATED WALKING-IN-PLACE FOOTSTEP LOCOMOTION

BACKGROUND OF THE INVENTION

This application claims priority for the TW patent application no. 112129381 filed on 4 Aug. 2023, the content of which is incorporated by reference in its entirely.

FIELD OF THE INVENTION

The present invention relates to a system for navigating a virtual environment, particularly to a system for navigating a virtual environment using seated walking-in-place footstep locomotion.

DESCRIPTION OF THE RELATED ART

The conventional video technology mainly provides experiences of passively viewing flat images and receiving sound signals. Users cannot move and interact as freely as they can in the real environment. In other words, video technology limits users' interactive experience and creates a sense of alienation between people.

Virtual Reality (VR) provides a high degree sense of immersion, allowing users to walk and interact freely in the virtual environment. Using virtual reality technology, users can visit shopping malls, appreciate art in art galleries, explore in amusement parks, and have face-to-face conversations with friends and business partners who are far away as if they were actually there. This interactivity and immersion in the virtual environment enhances the remote living and working experience and provides huge potential for the development of the Metaverse.

However, walking in virtual reality is a considerable challenge. The most intuitive method is to convert real-environment walking locomotion into virtual-environment walking locomotion, but this method requires sufficient space and cannot solve the fatigue problem caused by marching in place for a long time. The past research provides a walking method in a standing posture, which allows users to navigate the virtual environment simply by standing-walking in place, thereby solving the space problem. However, marching in place for a long time may make users feel tired and affect their virtual experience.

Therefore, the further development of virtual reality technology needs to solve the problem with walking in the virtual environment, such as developing a virtual walking-in-place method that uses a more comfortable and smaller space, so that users can more freely navigate the virtual environment to enhance the VR experience.

SUMMARY OF THE INVENTION

In order to the problems of the conventional technology, the objective of the present invention is to allow a user seated in place to navigate a virtual environment using simple locomotion.

In order to achieve the objective of the present invention, a system for navigating a virtual environment using seated walking-in-place footstep locomotion is provided, which includes a first sensing device, a second sensing device, and a virtual reality device. The first sensing device includes a first main body, a first sensor, and a first controller. The first sensor is arranged in a location where the first main body senses the first footstep locomotion of the first foot of the user in a seating posture and configured to sense the first footstep locomotion to generate the first stepping signal. The first controller is arranged on the first main body, connected to the first sensor, and configured to receive and transmit the first stepping signal to the virtual reality device. The second sensing device includes a second main body, a second sensor, and a second controller. The second sensor is arranged in a location where the second main body senses the second footstep locomotion of the second foot of the user in a seating posture and configured to sense the second footstep locomotion to generate the second stepping signal. The second controller is arranged on the second main body, connected to the second sensor, and configured to receive and transmit the second stepping signal to the virtual reality device. The virtual reality device navigates the virtual environment in a virtual locomotion mode according to the order of receiving the first stepping signal and the second stepping signal.

In an embodiment of the present invention, the virtual reality device is configured to operate an idle state that defines that the virtual reality device waits to receive any stepping signal.

In an embodiment of the present invention, the virtual reality device is configured to operate in a first pending state that defines the virtual reality device receives the first stepping signal or the second stepping signal in the idle state.

In an embodiment of the present invention, the virtual reality device includes a timer unit for setting reaction time. When the virtual reality device does not receive the first stepping signal or the second stepping signal within the reaction time in the first pending state, the virtual reality device returns to the idle state.

In an embodiment of the present invention, when the virtual reality device receives the first stepping signal in the idle state to enter the first pending state and receives the second stepping signal within the reaction time, the virtual locomotion mode in the virtual environment is a forward walking mode and the virtual reality device displays the user walking forward along a line of sight in the virtual environment according to the forward walking mode and a line of sight of the virtual environment. When the virtual reality device receives the second stepping signal in the idle state to enter the first pending state and receives the first stepping signal within the reaction time, the virtual locomotion mode in the virtual environment is a forward walking mode and the virtual reality device displays the user walking forward along a line of sight in the virtual environment according to the forward walking mode and a line of sight of the virtual environment.

In an embodiment of the present invention, when the virtual reality device receives the first stepping signal within the previous reaction time and receives the second stepping signal within the next reaction time in the forward walking mode or when the virtual reality device receives the second stepping signal within the previous reaction time and receives the first stepping signal within the next reaction time in the forward walking mode, the virtual reality device displays the user continuing walking forward along a line of sight in the virtual environment according to a line of sight of the virtual environment and the forward walking mode.

In an embodiment of the present invention, when the virtual reality device receives the first stepping signal within the previous reaction time and continues to receive the first stepping signal within the next reaction time in the forward walking mode or when the virtual reality device receives the second stepping signal within the previous reaction time and continues to receive the second stepping signal within the next reaction time in the forward walking mode, the virtual reality device returns to the first pending state.

In an embodiment of the present invention, when the virtual reality device receives the first stepping signal in the idle state to enter the first pending state and receives the first stepping signal within the reaction time, the virtual locomotion mode in the virtual environment is a first turning-in-place mode and the virtual reality device displays the user turning to a first direction from a line of sight in place in the virtual environment according to a line of sight of the virtual environment and the first turning-in-place mode.

In an embodiment of the present invention, when the virtual reality device continues receiving the first stepping signal within the next reaction time in the first turning-in-place mode, the virtual reality device displays the user turning to the first direction from a line of sight in place in the virtual environment according to a line of sight of the virtual environment and the first turning-in-place mode.

In an embodiment of the present invention, when the virtual reality device receives the second stepping signal in the idle state to enter the first pending state and receives the second stepping signal within the reaction time, the virtual locomotion mode in the virtual environment is a second turning-in-place mode whose turning direction is opposite to the turning direction of the first turning-in-place mode and the virtual reality device displays the user turning to a second direction from a line of sight in place in the virtual environment according to a line of sight of the virtual environment and the second turning-in-place mode.

In an embodiment of the present invention, when the virtual reality device continues receiving the second stepping signal within the next reaction time in the second turning-in-place mode, the virtual reality device displays the user turning to the second direction from a line of sight in place in the virtual environment according to a line of sight of the virtual environment and the second turning-in-place mode.

In an embodiment of the present invention, when the virtual reality device receives the second stepping signal within the next reaction time in the first turning-in-place mode or receives the first stepping signal within the next reaction time in the second turning-in-place mode, the virtual reality device returns to the first pending state.

In an embodiment of the present invention, the system further includes a third sensing device and a fourth sensing device. The third sensing device includes a third main body, a third sensor, and a third controller. The third sensor is arranged in a location where the third main body senses the third footstep locomotion of the first foot of the user in a seating posture and configured to sense the third footstep locomotion to generate and transmit the third stepping signal. The third controller is arranged on the third main body, connected to the third sensor, and configured to receive and transmit the third stepping signal to the virtual reality device. The fourth sensing device includes a fourth main body, a fourth sensor, and a fourth controller. The fourth sensor is arranged in a location where the fourth main body senses the fourth footstep locomotion of the second foot of the user in a seating posture and configured to sense the fourth footstep locomotion to generate the fourth stepping signal. The fourth controller is arranged on the fourth main body, connected to the fourth sensor, and configured to receive and transmit the fourth stepping signal to the virtual reality device.

In an embodiment of the present invention, locations where the first main body senses the first footstep locomotion and the third footstep locomotion are at the different locations of the same foot. Locations where the second main body senses the second footstep locomotion and the fourth footstep locomotion are at the different locations of the same foot. A location where the first main body senses the first footstep locomotion and a location where the second main body senses the second footstep locomotion are at the identical locations of different feet. A location where the first main body senses the third footstep locomotion and a location where the second main body senses the fourth footstep locomotion are at the identical locations of different feet.

In an embodiment of the present invention, the virtual reality device is configured to operate in a second pending state that defines the virtual reality device receives the third stepping signal or the fourth stepping signal in the idle state.

In an embodiment of the present invention, when the virtual reality device receives the third stepping signal or the fourth stepping signal within the reaction time in the forward walking mode, the first turning-in-place mode, or the second turning-in-place mode, the virtual reality device returns to the idle state.

In an embodiment of the present invention, when the virtual reality device does not receive the third stepping signal or the fourth stepping signal within the reaction time in the second pending state, the virtual reality device returns to the idle state.

In an embodiment of the present invention, when the virtual reality device receives the third stepping signal in the idle state to enter the second pending state and receives the fourth stepping signal within the reaction time, the virtual locomotion mode in the virtual environment is a backward walking mode and the virtual reality device displays the user walking backward along a line of sight in the virtual environment according to the backward walking mode and a line of sight of the virtual environment. When the virtual reality device receives the fourth stepping signal in the idle state to enter the second pending state and receives the third stepping signal within the reaction time, the virtual locomotion mode in the virtual environment is a backward walking mode and the virtual reality device displays the user walking backward along a line of sight in the virtual environment according to the backward walking mode and a line of sight of the virtual environment.

In an embodiment of the present invention, when the virtual reality device receives the third stepping signal within the previous reaction time and receives the fourth stepping signal within the next reaction time in the backward walking mode or when the virtual reality device receives the fourth stepping signal within the previous reaction time and receives the third stepping signal within the next reaction time in the backward walking mode, the virtual reality device displays the user continuing walking backward along a line of sight in the virtual environment according to a line of sight of the virtual environment and the backward walking mode.

In an embodiment of the present invention, when the virtual reality device receives the third stepping signal within the previous reaction time and continues to receive the third stepping signal within the next reaction time in the backward walking mode or when the virtual reality device receives the fourth stepping signal within the previous reaction time and continues to receive the fourth stepping signal within the next reaction time in the backward walking mode, the virtual reality device returns to the second pending state.

In an embodiment of the present invention, when the virtual reality device receives the third stepping signal in the idle state to enter the second pending state and receives the third stepping signal within the reaction time, the virtual locomotion mode in the virtual environment is a first side stepping mode and the virtual reality device displays the user walking toward a first side stepping direction from a line of sight in place in the virtual environment according to a line of sight of the virtual environment and the first side stepping mode.

In an embodiment of the present invention, when the virtual reality device continues receiving the third stepping signal within the next reaction time in the first side stepping mode, the virtual reality device displays the user walking toward the first side stepping direction from a line of sight in place in the virtual environment according to a line of sight of the virtual environment and the first side stepping mode.

In an embodiment of the present invention, when the virtual reality device receives the fourth stepping signal in the idle state to enter the second pending state and receives the fourth stepping signal within the reaction time, the virtual locomotion mode in the virtual environment is a second side stepping mode whose stepping direction is opposite to the stepping direction of the first side stepping mode and the virtual reality device displays the user walking toward a second side stepping direction from a line of sight in place in the virtual environment according to a line of sight of the virtual environment and the second side stepping mode.

In an embodiment of the present invention, when the virtual reality device continues receiving the fourth stepping signal within the next reaction time in the second side stepping mode, the virtual reality device displays the user walking toward the second side stepping direction from a line of sight in place in the virtual environment according to a line of sight of the virtual environment and the second side stepping mode.

In an embodiment of the present invention, when the virtual reality device receives the fourth stepping signal within next reaction time in the first side stepping mode or receives the third stepping signal within next reaction time in the second side stepping mode, the virtual reality device returns to the second pending state.

In an embodiment of the present invention, when the virtual reality device receives the first stepping signal or the second stepping signal within the reaction time in the backward walking mode, the first side stepping mode, or the second side stepping mode, the virtual reality device returns to the idle state.

In an embodiment of the present invention, when the virtual reality device receives the third stepping signal or the fourth stepping signal within the next reaction time in the first pending state or when the virtual reality device receives the first stepping signal or the second stepping signal within the next reaction time in the second pending state, the virtual reality device switches to the idle state.

In an embodiment of the present invention, when the virtual reality device receives the third stepping signal or the fourth stepping signal within the next reaction time in the first pending state, the virtual reality device switches to the second pending state. When the virtual reality device receives the first stepping signal or the second stepping signal within the next reaction time in the second pending state, the virtual reality device switches to the first pending state.

To sum up, the present invention can allow a user seating on a chair to navigate a virtual environment. The present invention uses multiple sensors to sense different locomotion of the user's footsteps to navigate the virtual environment, including locomotion such as forward walking, backward walking, turning in place, and side stepping, but the locomotion is not limited to these. Moreover, the present invention can be used anywhere. In addition, the seated operation can not only support long-term virtual experience, but also can adapt to various environments, such as seats in cars or airplanes, allowing people to enjoy the fun of the virtual environment anywhere.

Below, the embodiments are described in detail in cooperation with the drawings to make easily understood the technical contents, characteristics and accomplishments of the present invention.

DETAILED DESCRIPTION OF THE INVENTION

Figure 1:
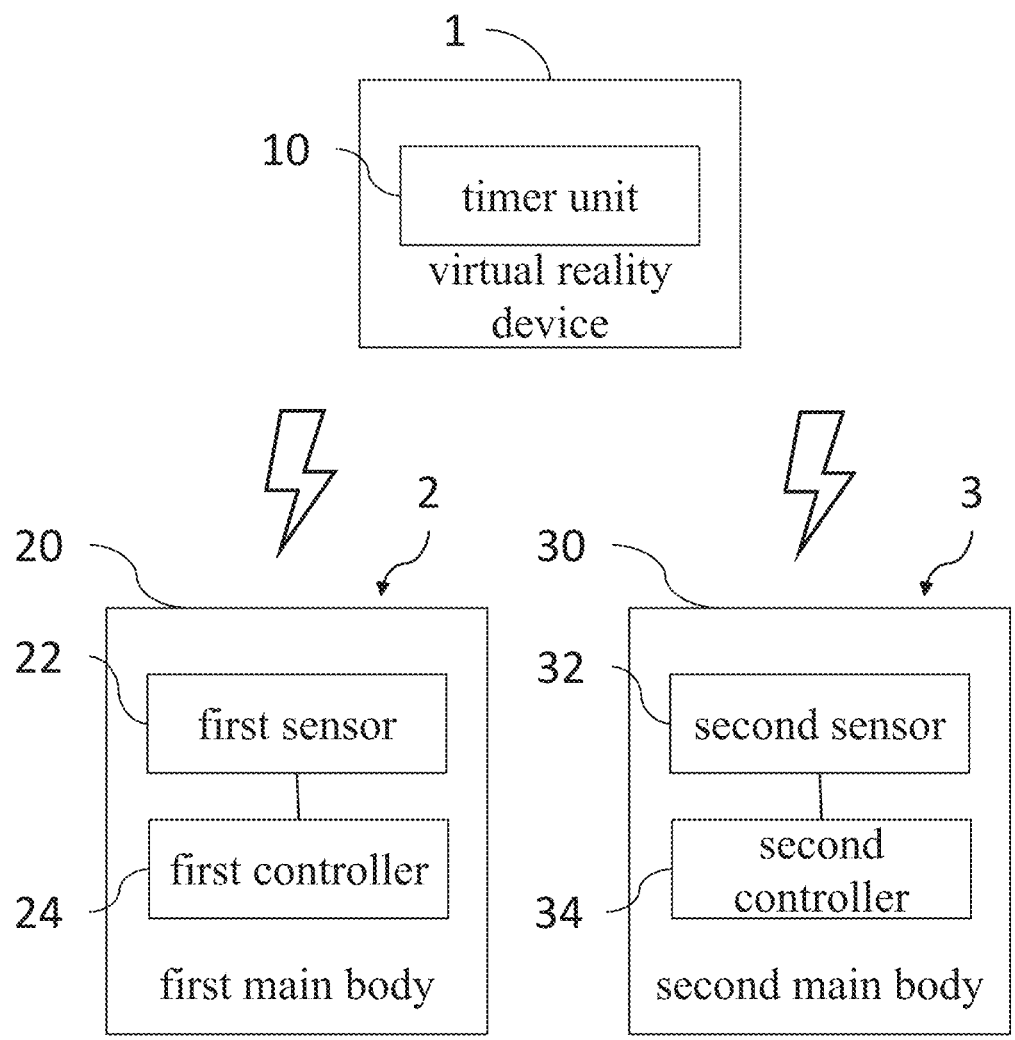
FIG. 1 is a schematic diagram illustrating a system according to an embodiment of the present invention.
Figure 2:
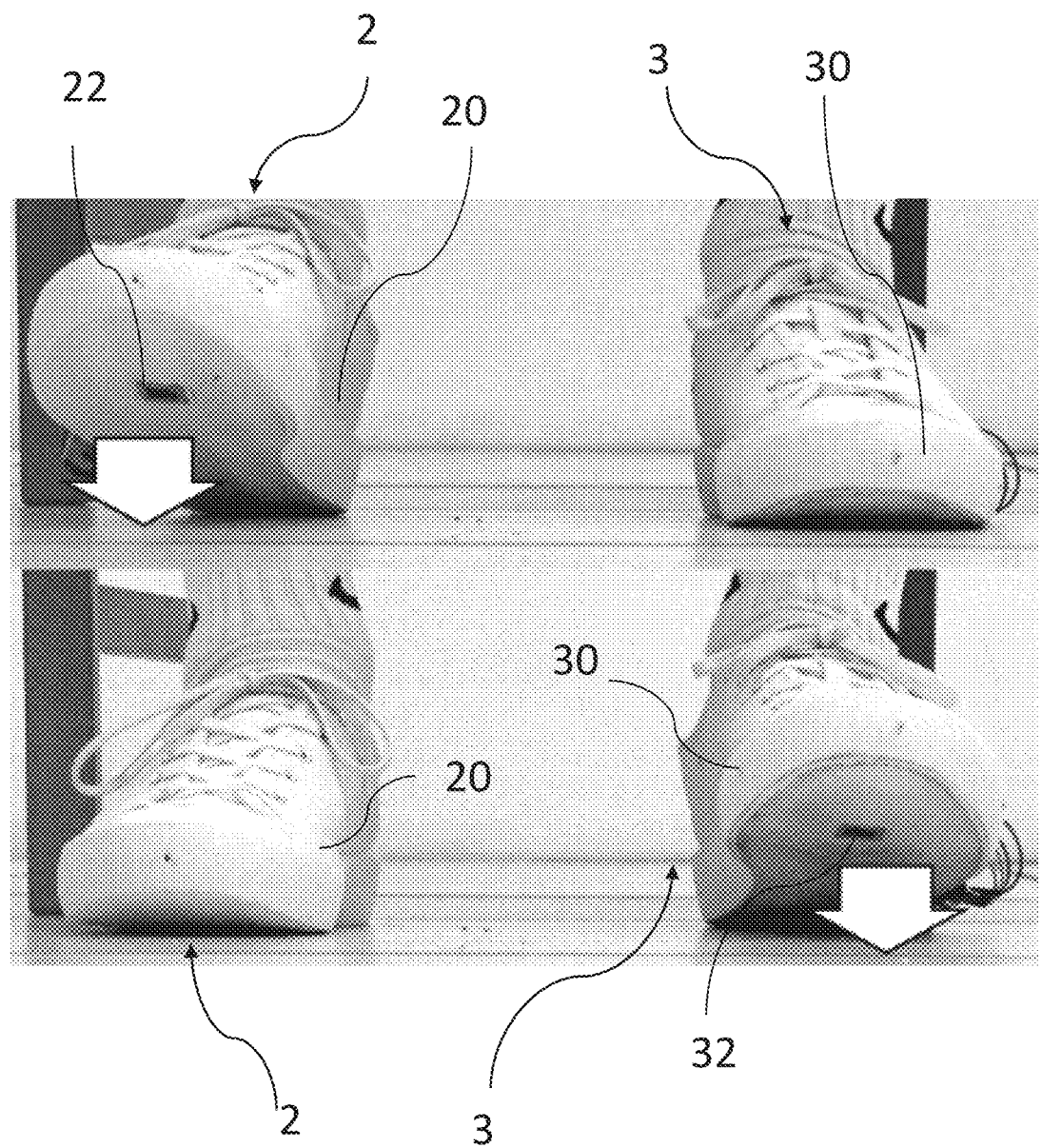
FIG. 2 is a picture showing a first sensing device and a second device in a practical application according to an embodiment of the present invention.

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

As illustrated in FIG. 1, the present invention provides a system for navigating a virtual environment using seated walking-in-place footstep locomotion, which includes a virtual reality device 1, a first sensing device 2, and a third sensing device 3. The first sensing device 2 includes a first main body 20, a first sensor 22, and a first controller 24. The first sensor 22 is arranged in a location where the first main body 20 senses the first footstep locomotion of the first foot of the user in a seating posture. The first sensor 22 senses the first footstep locomotion to generate a first stepping signal. The first controller 24, arranged on the first main body 20 and connected to the first sensor 22, receives and transmits the first stepping signal to the virtual reality device 1.

In addition, the second sensing device 3 includes a second main body 30, a second sensor 32, and a second controller 34. The second sensor 32 is arranged in a location where the second main body 30 senses the second footstep locomotion of the second foot of the user in a seating posture. The second sensor 32 senses the second footstep locomotion to generate the second stepping signal. The second controller 34, arranged on the second main body 30 and connected to the second sensor 32, receives and transmits the second stepping signal to the virtual reality device 1. The virtual reality device 1 receives the first stepping signal and the second stepping signal and navigates the virtual environment in a virtual locomotion mode according to the order of receiving the first stepping signal and the second stepping signal.

For example, the first main body 20 is a left shoe and the second main body 30 is a right shoe. Alternatively, the first main body 20 is a right shoe and the second main body 30 is a left shoe. However, the present invention is not limited to this in actual implementation. For example, the first main body 20 is a left foot pad and the second main body 30 is a right foot pad. Alternatively, the first main body 20 is a left foot pad. The first main body is the left part of the foot pad and the second main body 30 is the right part of the foot pad. Therefore, any objects that can sense the first footstep locomotion or the second footstep locomotion are respectively used as the first main body 20 and the second main body 30 claimed by the present invention.

In order to facilitate the understanding that the virtual reality device 1 generates the virtual locomotion mode in the virtual environment according to the order of receiving the first stepping signal and the second stepping signal, the present invention provides the following embodiment as reference. As illustrated in FIG. 1, the first main body 20 can be a left shoe and the first sensor 22 is arranged on the fore half of the left shoe (i.e., roughly from the front area of the left foot to the middle area of the left foot). The second main body 30 is a right shoe and the second sensor 32 is arranged on the fore half of the right shoe (i.e., roughly from the front area of the right foot to the middle area of the right foot).

Figure 3:
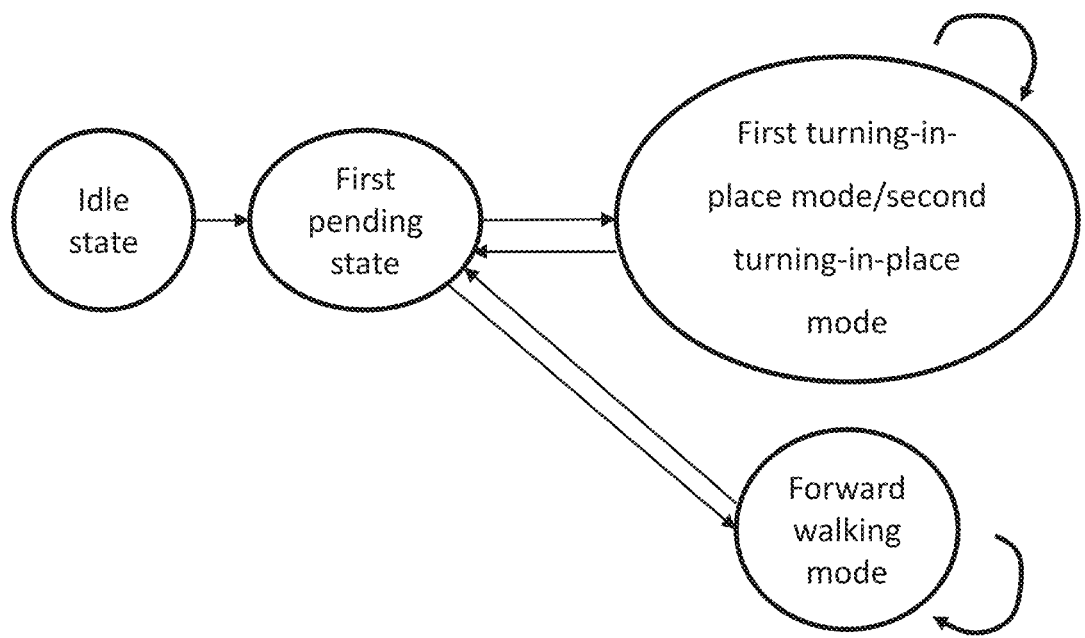
FIG. 3 is a schematic diagram illustrating the state machines of a virtual reality device according to the order of receiving first stepping signals and second stepping signals of the present invention.
Figure 4:
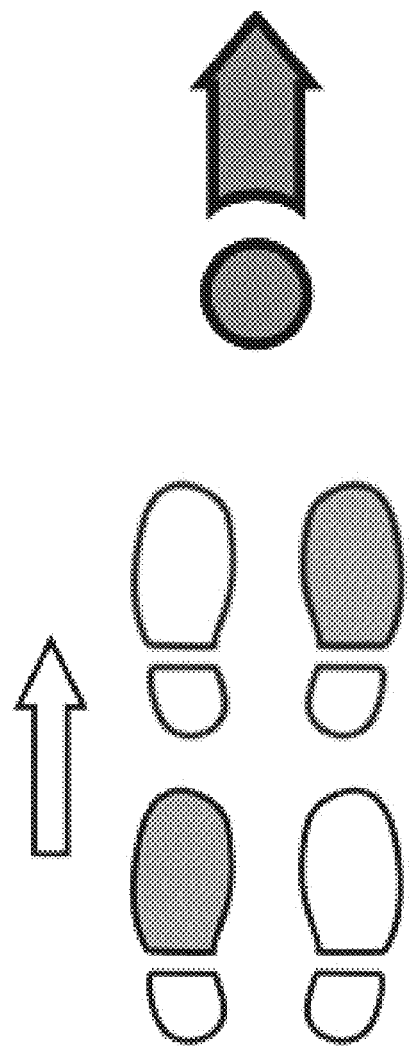
FIG. 4 is a schematic diagram illustrating the order of first stepping signals and second stepping signals received by a virtual reality device in a forward walking mode of the present invention.

Please refer to FIG. 1 and FIG. 3. The virtual reality device 1 is configured to operate an idle state that defines that the virtual reality device 1 waits to receive any stepping signal. The virtual reality device 1 is configured to operate in a first pending state that defines the virtual reality device 1 receives the first stepping signal or the second stepping signal in the idle state. The virtual reality device 1 includes a timer unit 10 for setting reaction time. When the virtual reality device 1 does not receive the first stepping signal or the second stepping signal within the reaction time in the first pending state, the virtual reality device 1 returns to the idle state.

When the virtual reality device 1 receives the first stepping signal in the idle state to enter the first pending state and receives the second stepping signal within the reaction time, the virtual locomotion mode in the virtual environment is a forward walking mode and the virtual reality device displays the user walking forward along a line of sight in the virtual environment according to the forward walking mode and a line of sight of the virtual environment. When the virtual reality device 1 receives the second stepping signal in the idle state to enter the first pending state and receives the first stepping signal within the reaction time, the virtual locomotion mode in the virtual environment is a forward walking mode and the virtual reality device 1 displays the user walking forward along a line of sight in the virtual environment according to the forward walking mode and a line of sight of the virtual environment. In other words, when the user in a seating posture enters the first pending state and the stepping signals sequentially received are different, the user will walk forward in the virtual environment.

In order to successfully and endlessly walk forward, the virtual reality device 1 performs the following operation. When the virtual reality device 1 receives the first stepping signal within the previous reaction time and receives the second stepping signal within the next reaction time in the forward walking mode or when the virtual reality device 1 receives the second stepping signal within the previous reaction time and receives the first stepping signal within the next reaction time in the forward walking mode, the virtual reality device 1 displays the user continuing walking forward along a line of sight in the virtual environment according to a line of sight of the virtual environment and the forward walking mode. This way, the user does not need to return to the pending mode before entering the first pending mode. Instead, the user can continue walking forward after receiving the first stepping signal and the second stepping signal alternately.

The first controller 24, the second controller 34, the first sensor 22, and the second sensor 32 all need to use power when operating. As a result, the first controller 24 is connected to a first power supply for providing operating power for the first controller 24 and the first sensor 22. The second controller 34 is connected to a second power supply for providing operating power for the second controller 34 and the second sensor 32. In order to successfully perform other locomotion modes, the virtual reality device 1 performs the following operation. When the virtual reality device 1 receives the first stepping signal within the previous reaction time and continues to receive the first stepping signal within the next reaction time in the forward walking mode or when the virtual reality device 1 receives the second stepping signal within the previous reaction time and continues to receive the second stepping signal within the next reaction time in the forward walking mode, the virtual reality device 1 returns to the first pending state.

Figure 5:
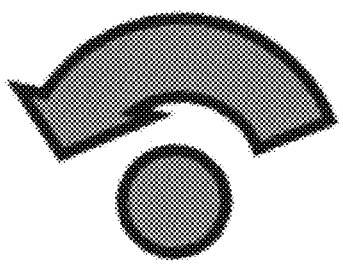
FIG. 5 is a schematic diagram illustrating the order of first stepping signals and second stepping signals received by a virtual reality device in a first turning-in-place mode of the present invention.
Figure 5:
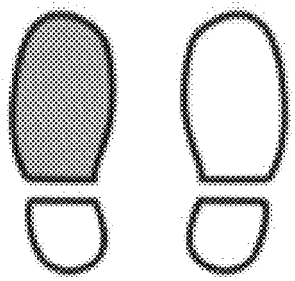
Figure 5:
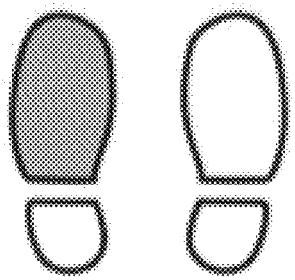

As illustrated in FIG. 3 and FIG. 5, when the virtual reality device 1 receives the first stepping signal in the idle state to enter the first pending state and receives the first stepping signal within the reaction time, the virtual locomotion mode in the virtual environment is a first turning-in-place mode and the virtual reality device 1 displays the user turning to a first direction from a line of sight in place in the virtual environment according to a line of sight of the virtual environment and the first turning-in-place mode.

Besides, when the virtual reality device 1 continues receiving the first stepping signal within the next reaction time in the first turning-in-place mode, the virtual reality device 1 displays the user turning to the first direction from a line of sight in place in the virtual environment according to a line of sight of the virtual environment and the first turning-in-place mode. As a result, as long as the first stepping signal is endlessly received in the first turning-in-place mode, the virtual reality device 1 displays the user endlessly turning to the first direction from a line of sight in place.

Figure 6:
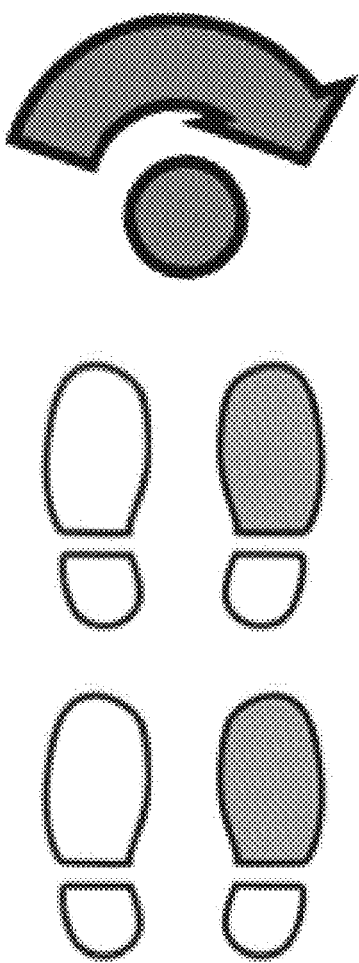
FIG. 6 is a schematic diagram illustrating the order of first stepping signals and second stepping signals received by a virtual reality device in a second turning-in-place mode of the present invention.
Figure 7:
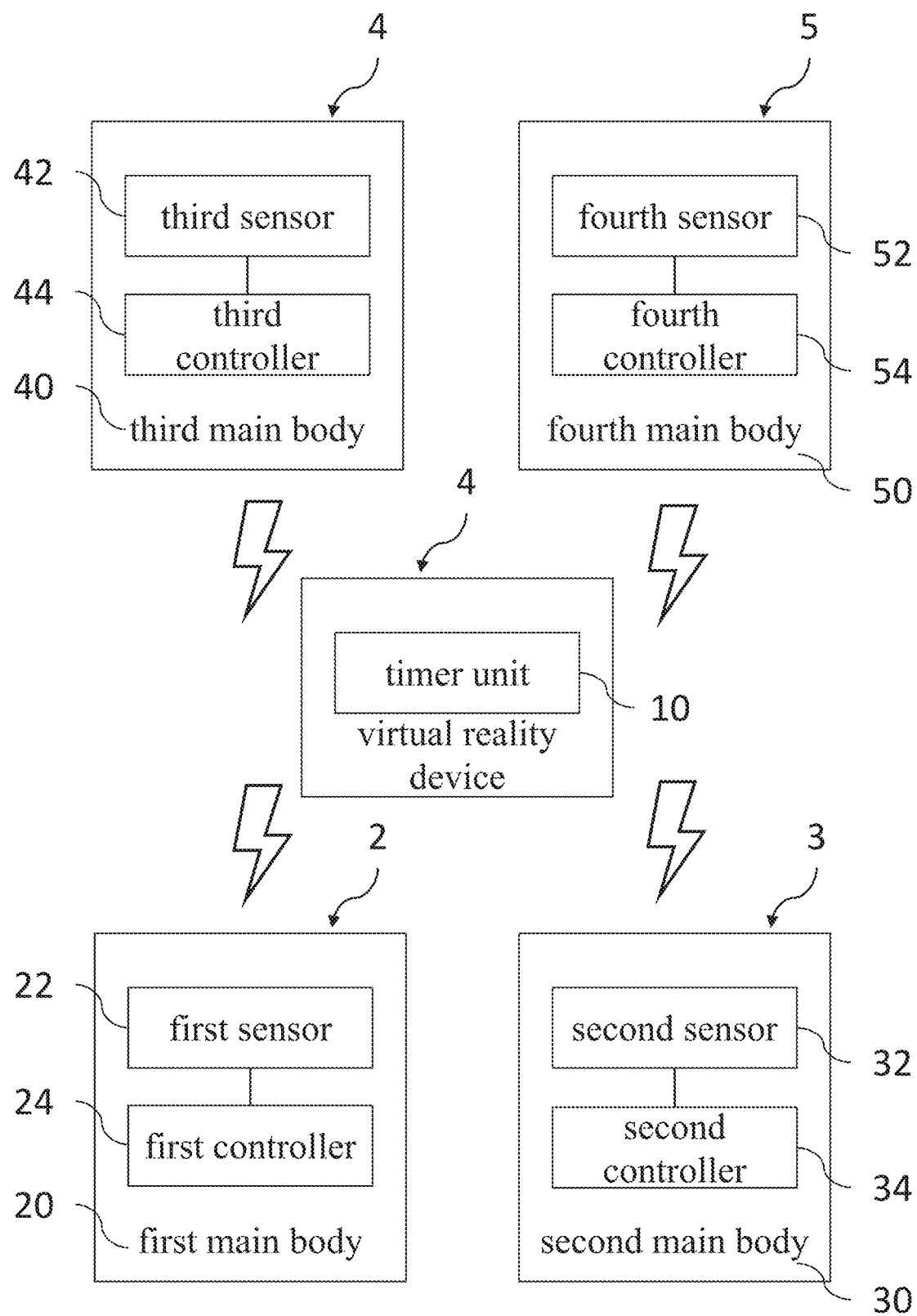
FIG. 7 is a schematic diagram illustrating a system according to another embodiment of the present invention.

As illustrated in FIG. 3 and FIG. 6, when the virtual reality device 1 receives the second stepping signal in the idle state to enter the second pending state and receives the second stepping signal within the reaction time, the virtual locomotion mode in the virtual environment is a second turning-in-place mode and the virtual reality device 1 displays the user turning to a second direction from a line of sight in place in the virtual environment according to a line of sight of the virtual environment and the second turning-in-place mode. The turning direction of the first turning-in-place mode is opposite to that of the second turning-in-place mode. The virtual reality device 1 displays the user turning to a second direction from a line of sight in place in the virtual environment according to a line of sight of the virtual environment and the second turning-in-place mode.

Besides, when the virtual reality device 1 continues receiving the second stepping signal within the next reaction time in the second turning-in-place mode, the virtual reality device 1 displays the user turning to the second direction from a line of sight in place in the virtual environment according to a line of sight of the virtual environment and the second turning-in-place mode. As a result, as long as the second stepping signal is endlessly received in the second turning-in-place mode, the virtual reality device 1 displays the user endlessly turning to the second direction from a line of sight in place.

When the virtual reality device 1 receives the second stepping signal within the next reaction time in the first turning-in-place mode or receives the first stepping signal within the next reaction time in the second turning-in-place mode, the virtual reality device 1 returns to the first pending state. As a result, the virtual reality device 1 returns to the first pending state from the first turning-in-place mode or the second turning-in-place mode, so that the virtual reality device 1 may subsequently need to enter the forward walking mode.

In order to increase the type of the locomotion of the user in a seating posture, the present invention further includes a third sensing device 4 and a fourth sensing device 5, as illustrated in FIGS. 7-10. The third sensing device 4 includes a third main body 40, a third sensor 42, and a third controller 44. The third sensor 42, arranged in a location where the third main body 40 senses the third footstep locomotion of the first foot of the user in a seating posture, senses the third footstep locomotion to generate a third stepping signal. The third controller 44, arranged on the third main body 40 and connected to the third sensor 42, receives and transmits the third stepping signal to the virtual reality device 1.

On top of that, the fourth sensing device 5 includes a fourth main body 50, a fourth sensor 52, and a fourth controller 54. The fourth sensor 52, arranged in a location where the fourth main body 50 senses the fourth footstep locomotion of the second foot of the user in a seating posture, senses the fourth footstep locomotion to generate a fourth stepping signal. The fourth controller 54, arranged on the fourth main body 50 and connected to the fourth sensor 52, receives and transmits the fourth stepping signal to the virtual reality device 1.

Furthermore, locations where the first main body 20 senses the first footstep locomotion and the third footstep locomotion are at the different locations of the same foot. Locations where the second main body 30 senses the second footstep locomotion and the fourth footstep locomotion are at the different locations of the same foot. A location where the first main body 20 senses the first footstep locomotion and a location where the second main body 30 senses the second footstep locomotion are at the identical locations of different fee. A location where the first main body 20 senses the third footstep locomotion and a location where the second main body 30 senses the fourth footstep locomotion are at the identical locations of different feet.

Figure 8:
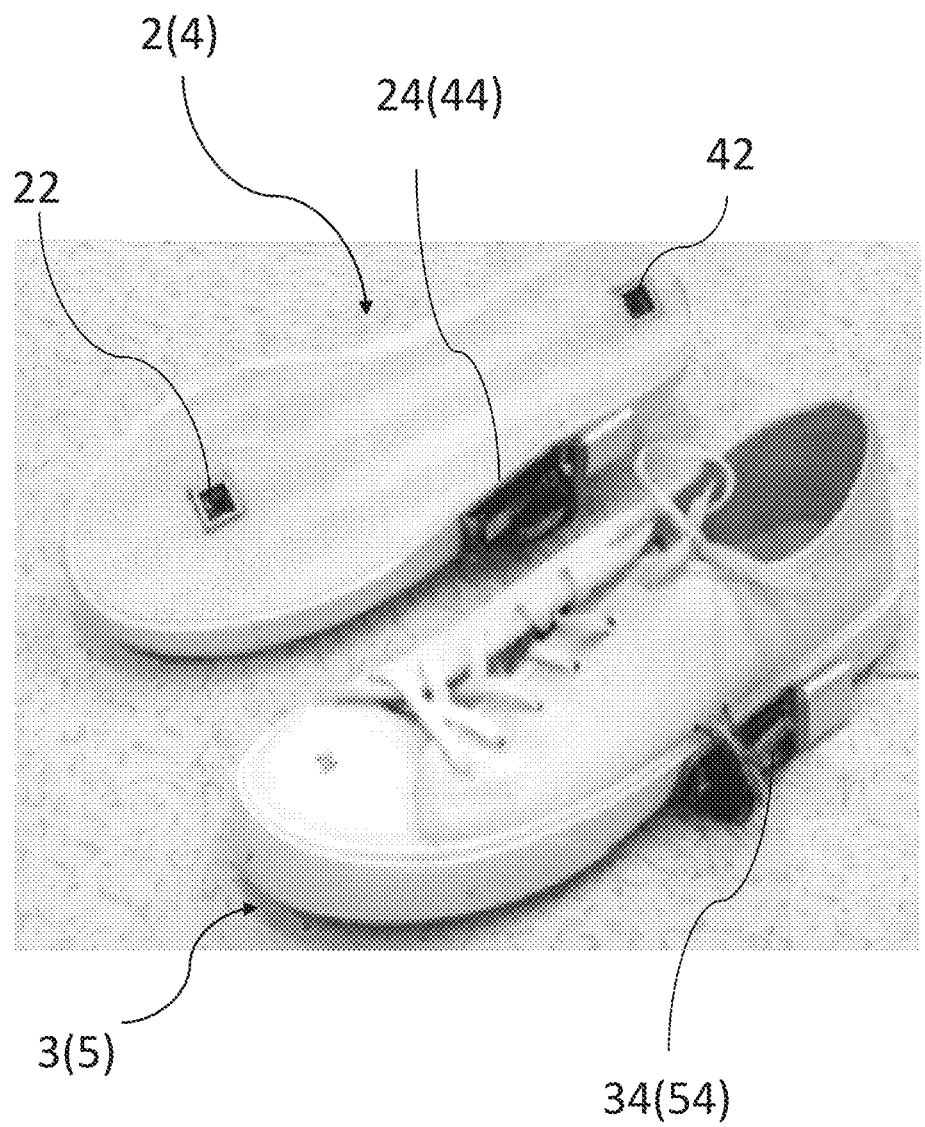
FIG. 8 is a picture showing a first sensing device, a second device, a third sensing device, and a fourth sensing device in a practical application according to an embodiment of the present invention.

For example, as illustrated in FIG. 8, the first sensor 22 is arranged on the fore half of the left shoe (i.e., roughly from the front area of the left foot to the middle area of the left foot). The second main body 30 is the right shoe. The second sensor 32 is arranged on the fore half of the right shoe (i.e., roughly from the front area of the right foot to the middle area of the right foot). The third sensor 42 is arranged on the rear half of the left shoe (i.e., roughly the rear area of the left foot). The fourth sensor 52 is arranged on the rear half of the right shoe (i.e., roughly the rear area of the right foot). In addition, in the present invention, the first controller and the third controller 44 may be integrated into the same controller and may be an embedded system. The second controller and the fourth controller 54 may be integrated into another controller and may be an embedded system. The first sensor 22, the second sensor 32, the third sensor 42, and the fourth sensor 52 can be light sensors.

Figure 9:
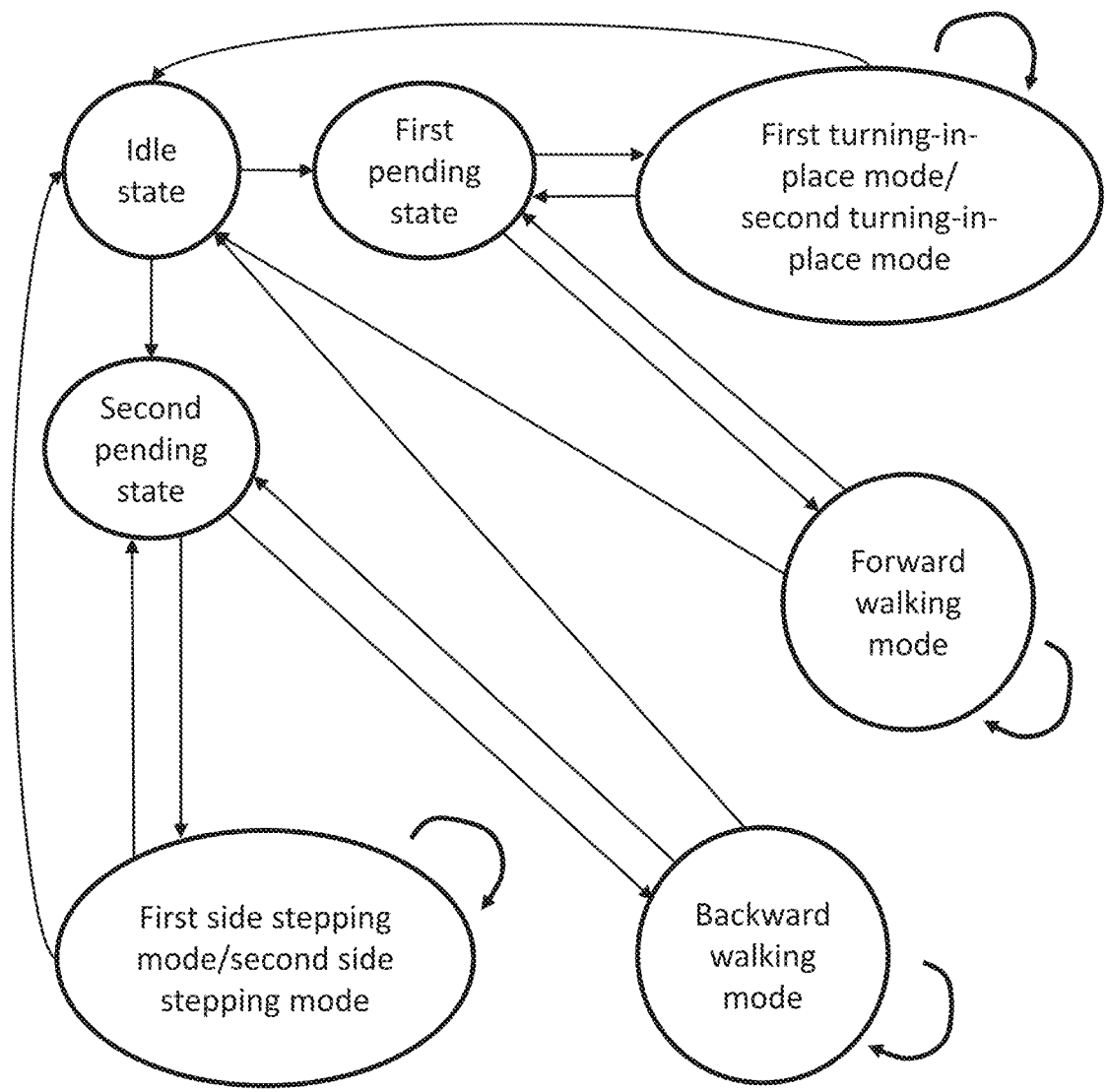
FIG. 9 is a schematic diagram illustrating the state machines of a virtual reality device according to the order of receiving first stepping signals, second stepping signals, third stepping signals, and fourth stepping signals of the present invention.
Figure 10:
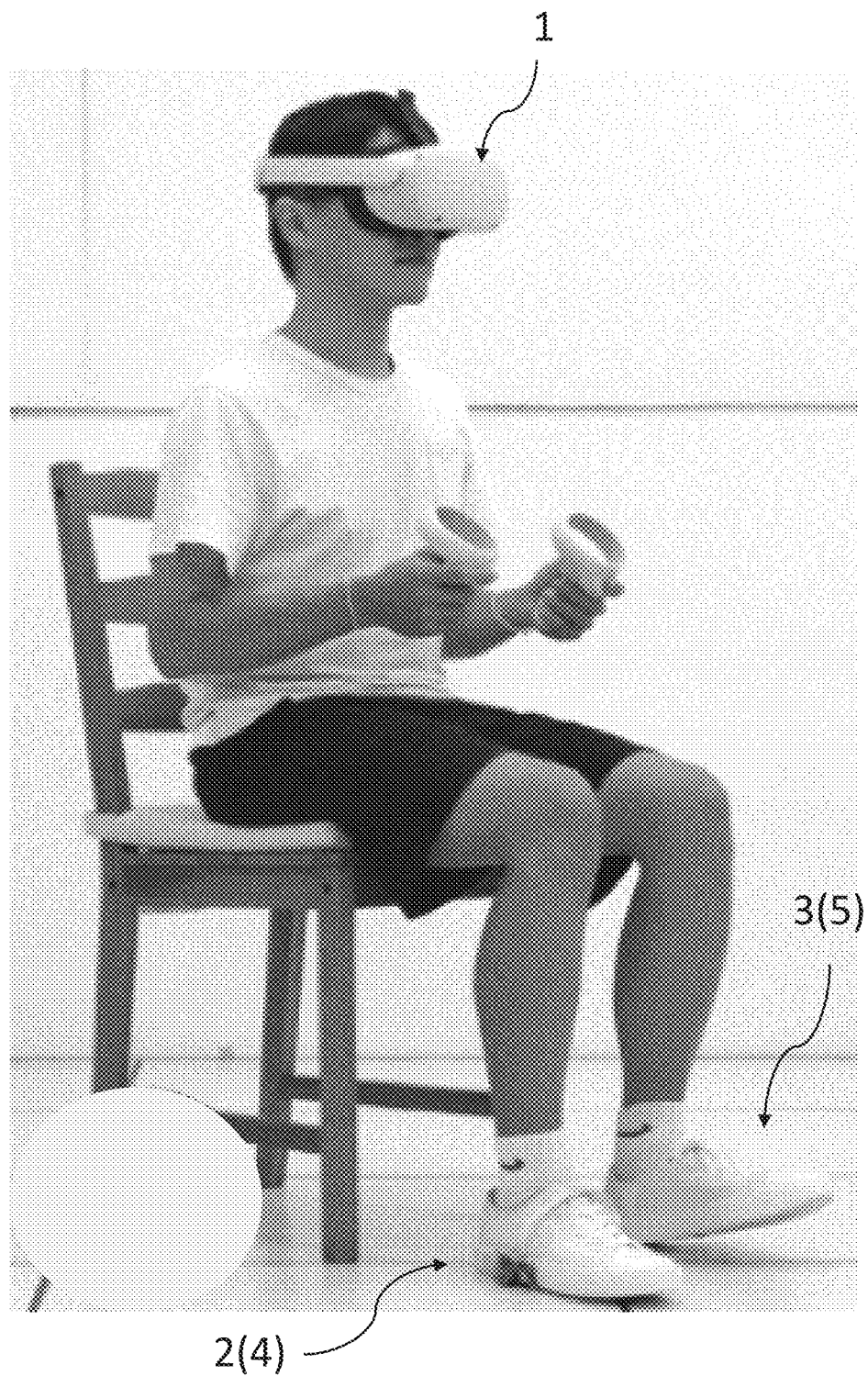
FIG. 10 is a schematic diagram illustrating a virtual reality device, a first sensing device, a second sensing device, a third sensing device, and a fourth sensing device that are worn of the present invention.

As illustrated in FIG. 9, the virtual reality device 1 operates in a second pending state that defines the virtual reality device 1 receives the third stepping signal or the fourth stepping signal in the idle state. When the virtual reality device 1 receives the third stepping signal or the fourth stepping signal within the reaction time in the first pending state, the virtual reality device returns to the idle state. When the virtual reality device 1 receives the first stepping signal or the second stepping signal within the reaction time in the second pending state, the virtual reality device returns to the idle state.

Figure 11:
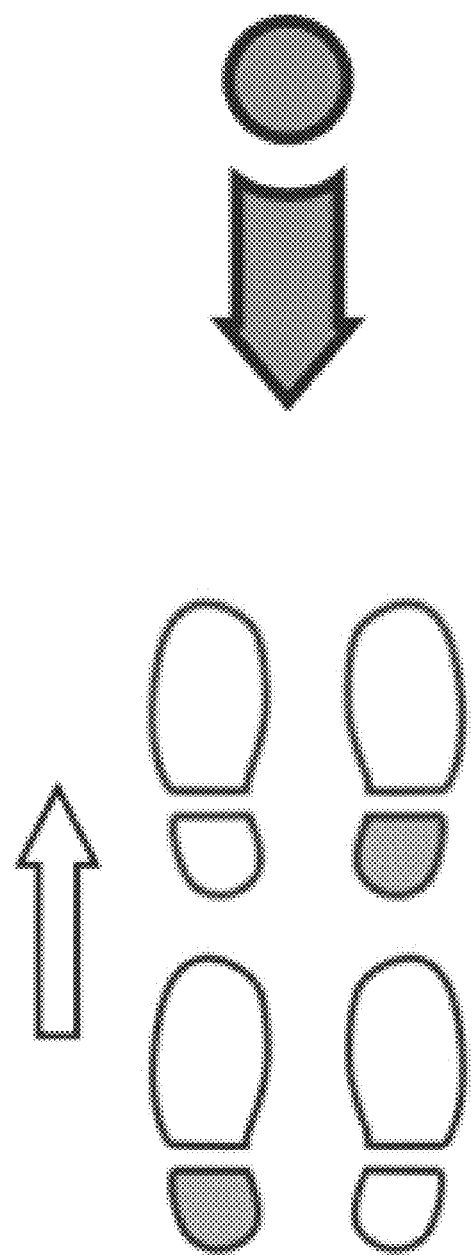
FIG. 11 is a schematic diagram illustrating the order of third stepping signals and fourth stepping signals received by a virtual reality device in a backward walking mode of the present invention.

As illustrated in FIG. 9 and FIG. 11, when the virtual reality device 1 receives the third stepping signal in the idle state to enter the second pending state and receives the fourth stepping signal within the reaction time, the virtual locomotion mode in the virtual environment is a backward walking mode and the virtual reality device 1 displays the user walking backward along a line of sight in the virtual environment according to the backward walking mode and a line of sight of the virtual environment. When the virtual reality device 1 receives the fourth stepping signal in the idle state to enter the second pending state and receives the third stepping signal within the reaction time, the virtual locomotion mode in the virtual environment is a backward walking mode and the virtual reality device 1 displays the user walking backward along a line of sight in the virtual environment according to the backward walking mode and a line of sight of the virtual environment.

Moreover, when the virtual reality device 1 receives the third stepping signal within the previous reaction time and receives the fourth stepping signal within the next reaction time in the backward walking mode or when the virtual reality device 1 receives the fourth stepping signal within the previous reaction time and receives the third stepping signal within the next reaction time in the backward walking mode, the virtual reality device 1 displays the user continuing walking backward along a line of sight in the virtual environment according to a line of sight of the virtual environment and the backward walking mode. As a result, in the backward walking mode, the virtual reality device 1 alternately receives the third stepping signal and the fourth stepping signal to endlessly walk backward in the virtual environment.

When the virtual reality device 1 receives the third stepping signal within the previous reaction time and continues to receive the third stepping signal within the next reaction time in the backward walking mode or when the virtual reality device 1 receives the fourth stepping signal within the previous reaction time and continues to receive the fourth stepping signal within the next reaction time in the backward walking mode, the virtual reality device 1 returns to the second pending state to facilitate the virtual reality device 1 to perform other locomotion modes.

Figure 12:
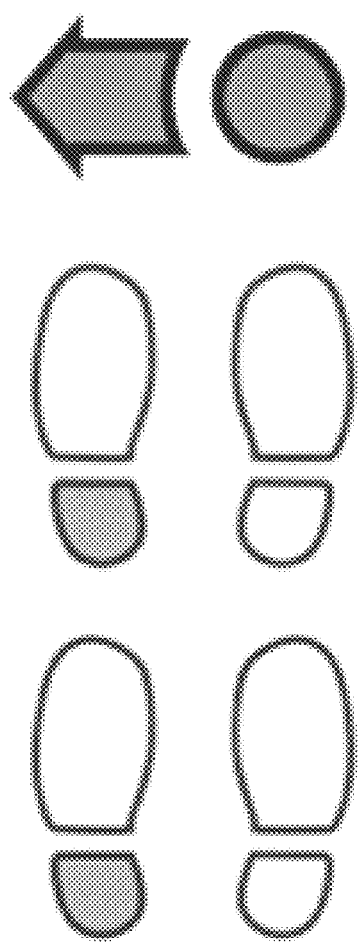
FIG. 12 is a schematic diagram illustrating the order of third stepping signals and fourth stepping signals received by a virtual reality device in a first side stepping mode of the present invention.

As illustrated in FIG. 9 and FIG. 12, when the virtual reality device 1 receives the third stepping signal in the idle state to enter the second pending state and receives the third stepping signal within the reaction time, the virtual locomotion mode in the virtual environment is a first side stepping mode and the virtual reality device 1 displays the user walking toward a first side stepping direction from a line of sight in place in the virtual environment according to a line of sight of the virtual environment and the first side stepping mode.

When the virtual reality device 1 continues receiving the third stepping signal within the next reaction time in the first side stepping mode, the virtual reality device 1 displays the user walking toward the first side stepping direction from a line of sight in place in the virtual environment according to a line of sight of the virtual environment and the first side stepping mode. As a result, the virtual reality device 1 displays the user endlessly walking toward the first side stepping direction. The third stepping signal is generated by the third sensor 42 on the left shoe. In other words, the virtual reality device 1 can display the user moving laterally to the left by endlessly stepping on the left rear heel.

Figure 13:
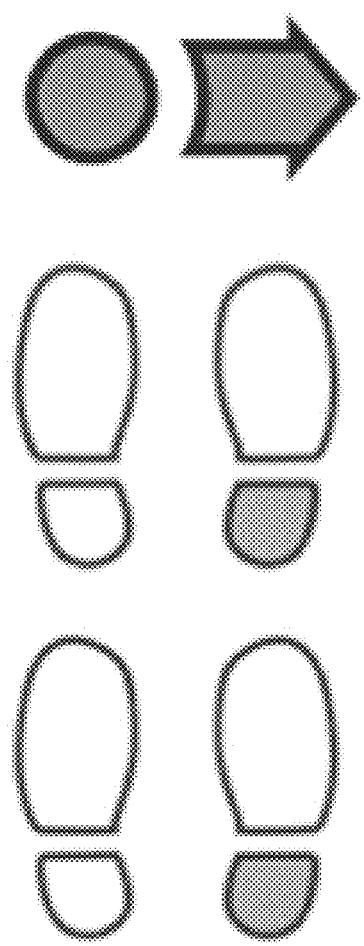
FIG. 13 is a schematic diagram illustrating the order of third stepping signals and fourth stepping signals received by a virtual reality device in a second side stepping mode of the present invention.

As illustrated in FIG. 9 and FIG. 13, when the virtual reality device 1 receives the fourth stepping signal in the idle state to enter the second pending state and receives the fourth stepping signal within the reaction time, the virtual locomotion mode in the virtual environment is a second side stepping mode whose stepping direction is opposite to the stepping direction of the first side stepping mode and the virtual reality device 1 displays the user walking toward a second side stepping direction from a line of sight in place in the virtual environment according to a line of sight of the virtual environment and the second side stepping mode.

When the virtual reality device 1 continues receiving the fourth stepping signal within the next reaction time in the second side stepping mode, the virtual reality device 1 displays the user walking toward the second side stepping direction from a line of sight in place in the virtual environment according to a line of sight of the virtual environment and the second side stepping mode. As a result, the virtual reality device 1 displays the user endlessly walking toward the second side stepping direction. The fourth stepping signal is generated by the fourth sensor 42 on the right shoe. In other words, the virtual reality device 1 can display the user moving laterally to the right by endlessly stepping on the right rear heel.

In order to sense different locomotion to perform other modes in the first side stepping mode or the second side stepping mode, the virtual reality device 1 returns to the second pending state when the virtual reality device 1 receives the fourth stepping signal within the next reaction time in the first side stepping mode or receives the third stepping signal within the next reaction time in the second side stepping mode.

The virtual reality device 1 can continue to perform other locomotion modes after receiving stepping signals from different feet in the first pending state or the second pending state. Please refer to FIG. 9. When the virtual reality device 1 receives the third stepping signal or the fourth stepping signal within the next reaction time in the first pending state or receives the first stepping signal or the second stepping signal within next reaction time in the second pending state, the virtual reality device 1 switches to the idle state.

Furthermore, the virtual reality device 1 can switch to the second pending state after receiving stepping signals from different feet in the first pending state. Alternatively, the virtual reality device 1 can switch to the first pending state after receiving stepping signals from different feet in the second pending state. Please refer to FIG. 9. When the virtual reality device 1 receives the third stepping signal or the fourth stepping signal within the next reaction time in the first pending state, the virtual reality device 1 switches to the second pending state. Alternatively, when the virtual reality device 1 receives the first stepping signal or the second stepping signal within the next reaction time in the second pending state, the virtual reality device 1 switches to the first pending state.

When the virtual reality device 1 receives the third stepping signal or the fourth stepping signal within the reaction time in the forward walking mode, the first turning-in-place mode, or the second turning-in-place mode, the virtual reality device 1 returns to the idle state. When the virtual reality device 1 receives the first stepping signal or the second stepping signal within the reaction time in the backward walking mode, the first side stepping mode, or the second side stepping mode, the virtual reality device 1 returns to the idle state.

The present invention uses multiple sensors to sense different locomotion of the user's footsteps to achieve a real movement experience in the virtual environment, including walking forward, walking backward, turning in place, and side stepping, the present invention is not limited thereto. The technology of the present invention that can be used anywhere is scalable and adaptable. In addition, compared with conventional virtual locomotion methods, the present invention provides users with a longer virtual experience without the need to wear bulky equipment or occupy large space. Whether at home, in an office, in a car, or even in a seat on an airplane, the present invention performs locomotion operations in the virtual environment based on an innovative seating posture, allowing users to easily immerse themselves in the virtual environment. Furthermore, the footstep locomotion of the present invention is like the natural walking behavior, ensuring that the user can walk in the virtual environment with more natural, smooth, and precise locomotion in the physical environment. This innovative virtual locomotion technology will bring unprecedented virtual reality experiences, which will enhance the possibilities in the entertainment field. In addition, the technology is also expected to play an important role in education, training and other practical fields.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A system for navigating a virtual environment using seated walking-in-place footstep locomotion, the system comprising:
   a first sensing device configured to sense first footstep locomotion of one of feet of a user seated in a physical environment to generate and transmit a first stepping signal, wherein the first sensing device comprises:
      a first main body;
      a first sensor arranged in a location where the first main body senses the first footstep locomotion of a first foot of the user in a seating posture and configured to sense the first footstep locomotion to generate the first stepping signal; and
      a first controller, arranged on the first main body, connected to the first sensor, and configured to receive and transmit the first stepping signal;
   a second sensing device configured to sense second footstep locomotion of another of the feet of the user seated in the physical environment to generate and transmit a second stepping signal; and
   a virtual reality device configured to receive the first stepping signal and the second stepping signal and navigate the virtual environment in a virtual locomotion mode according to an order of receiving the first stepping signal and the second stepping signal.

2. The system for navigating the virtual environment using seated walking-in-place footstep locomotion according to claim 1, wherein the second sensing device comprises:
   a second main body;
   a second sensor arranged in a location where the second main body senses the second footstep locomotion of a second foot of the user in a seating posture and configured to sense the second footstep locomotion to generate the second stepping signal; and
   a second controller, arranged on the second main body, connected to the second sensor, and configured to receive and transmit the second stepping signal.

3. The system for navigating the virtual environment using seated walking-in-place footstep locomotion according to claim 2, wherein the virtual reality device is configured to operate an idle state that defines that the virtual reality device waits to receive the first stepping signal or the second stepping signal.

4. The system for navigating the virtual environment using seated walking-in-place footstep locomotion according to claim 3, wherein the virtual reality device is configured to operate in a first pending state that defines the virtual reality device receives the first stepping signal or the second stepping signal in the idle state.

5. The system for navigating the virtual environment using seated walking-in-place footstep locomotion according to claim 4, wherein the virtual reality device includes a timer unit for setting reaction time and when the virtual reality device does not receive the first stepping signal or the second stepping signal within the reaction time in the first pending state, the virtual reality device returns to the idle state.

6. The system for navigating the virtual environment using seated walking-in-place footstep locomotion according to claim 5, wherein when the virtual reality device receives the first stepping signal in the idle state to enter the first pending state and receives the second stepping signal within the reaction time, the virtual locomotion mode in the virtual environment is a forward walking mode and the virtual reality device displays the user walking forward along a line of sight in the virtual environment according to the forward walking mode and a line of sight of the virtual environment; and when the virtual reality device receives the second stepping signal in the idle state to enter the first pending state and receives the first stepping signal within the reaction time, the virtual locomotion mode in the virtual environment is a forward walking mode and the virtual reality device displays the user walking forward along a line of sight in the virtual environment according to the forward walking mode and a line of sight of the virtual environment.

7. The system for navigating the virtual environment using seated walking-in-place footstep locomotion according to claim 6, wherein when the virtual reality device receives the first stepping signal within previous reaction time and receives the second stepping signal within next reaction time in the forward walking mode or when the virtual reality device receives the second stepping signal within previous reaction time and receives the first stepping signal within next reaction time in the forward walking mode, the virtual reality device displays the user continuing walking forward along a line of sight in the virtual environment according to a line of sight of the virtual environment and the forward walking mode.

8. The system for navigating the virtual environment using seated walking-in-place footstep locomotion according to claim 6, wherein when the virtual reality device receives the first stepping signal within previous reaction time and continues to receive the first stepping signal within next reaction time in the forward walking mode or when the virtual reality device receives the second stepping signal within previous reaction time and continues to receive the second stepping signal within next reaction time in the forward walking mode, the virtual reality device returns to the first pending state.

9. The system for navigating the virtual environment using seated walking-in-place footstep locomotion according to claim 6, wherein when the virtual reality device receives the first stepping signal in the idle state to enter the first pending state and receives the first stepping signal within the reaction time, the virtual locomotion mode in the virtual environment is a first turning-in-place mode and the virtual reality device displays the user turning to a first direction from a line of sight in place in the virtual environment according to a line of sight of the virtual environment and the first turning-in-place mode.

10. The system for navigating the virtual environment using seated walking-in-place footstep locomotion according to claim 9, wherein when the virtual reality device continues receiving the first stepping signal within next reaction time in the first turning-in-place mode, the virtual reality device displays the user turning to the first direction from a line of sight in place in the virtual environment according to a line of sight of the virtual environment and the first turning-in-place mode.

11. The system for navigating the virtual environment using seated walking-in-place footstep locomotion according to claim 10, wherein when the virtual reality device receives the second stepping signal in the idle state to enter the first pending state and receives the second stepping signal within the reaction time, the virtual locomotion mode in the virtual environment is a second turning-in-place mode whose turning direction is opposite to a turning direction of the first turning-in-place mode and the virtual reality device displays the user turning to a second direction from a line of sight in place in the virtual environment according to a line of sight of the virtual environment and the second turning-in-place mode.

12. The system for navigating the virtual environment using seated walking-in-place footstep locomotion according to claim 11, wherein when the virtual reality device continues receiving the second stepping signal within next reaction time in the second turning-in-place mode, the virtual reality device displays the user turning to the second direction from a line of sight in place in the virtual environment according to a line of sight of the virtual environment and the second turning-in-place mode.

13. The system for navigating the virtual environment using seated walking-in-place footstep locomotion according to claim 12, wherein when the virtual reality device receives the second stepping signal within next reaction time in the first turning-in-place mode or receives the first stepping signal within next reaction time in the second turning-in-place mode, the virtual reality device returns to the first pending state.

14. The system for navigating the virtual environment using seated walking-in-place footstep locomotion according to claim 13, further comprising:
a third sensing device configured to sense third footstep locomotion of one of the feet of the user seated in the physical environment to generate and transmit a third stepping signal to the virtual reality device; and
a fourth sensing device configured to sense fourth footstep locomotion of another of the feet of the user seated in the physical environment to generate and transmit a fourth stepping signal.

15. The system for navigating the virtual environment using seated walking-in-place footstep locomotion according to claim 14, wherein the third sensing device comprises:
a third main body;
a third sensor arranged in a location where the third main body senses the third footstep locomotion of a first foot of the user in a seating posture and configured to sense the third footstep locomotion to generate the third stepping signal; and
a third controller, arranged on the third main body, connected to the third sensor, and configured to receive and transmit the third stepping signal to the virtual reality device.

16. The system for navigating the virtual environment using seated walking-in-place footstep locomotion according to claim 15, wherein the fourth sensing device comprises:
a fourth main body;
a fourth sensor arranged in a location where the fourth main body senses the fourth footstep locomotion of a second foot of the user in a seating posture and configured to sense the fourth footstep locomotion to generate the fourth stepping signal; and
a fourth controller, arranged on the fourth main body, connected to the fourth sensor, and configured to receive and transmit the fourth stepping signal to the virtual reality device.

17. The system for navigating the virtual environment using seated walking-in-place footstep locomotion according to claim 16, wherein locations where the first main body senses the first footstep locomotion and the third footstep locomotion are at different locations of the same foot; locations where the second main body senses the second footstep locomotion and the fourth footstep locomotion are at different locations of the same foot; a location where the first main body senses the first footstep locomotion and a location where the second main body senses the second footstep locomotion are at identical locations of different feet; and a location where the first main body senses the third footstep locomotion and a location where the second main body senses the fourth footstep locomotion are at identical locations of different feet.

18. The system for navigating the virtual environment using seated walking-in-place footstep locomotion according to claim 14, wherein the virtual reality device is configured to operate in a second pending state that defines the virtual reality device receives the third stepping signal or the fourth stepping signal in the idle state.

19. The system for navigating the virtual environment using seated walking-in-place footstep locomotion according to claim 18, wherein when the virtual reality device does not receive the third stepping signal or the fourth stepping signal within the reaction time in the second pending state, the virtual reality device returns to the idle state.

20. The system for navigating the virtual environment using seated walking-in-place footstep locomotion according to claim 19, wherein when the virtual reality device receives the third stepping signal in the idle state to enter the second pending state and receives the fourth stepping signal within the reaction time, the virtual locomotion mode in the virtual environment is a backward walking mode and the virtual reality device displays the user walking backward along a line of sight in the virtual environment according to the backward walking mode and a line of sight of the virtual environment; and when the virtual reality device receives the fourth stepping signal in the idle state to enter the second pending state and receives the third stepping signal within the reaction time, the virtual locomotion mode in the virtual environment is a backward walking mode and the virtual reality device displays the user walking backward along a line of sight in the virtual environment according to the backward walking mode and a line of sight of the virtual environment.

21. The system for navigating the virtual environment using seated walking-in-place footstep locomotion according to claim 20, wherein when the virtual reality device receives the third stepping signal within previous reaction time and receives the fourth stepping signal within next reaction time in the backward walking mode or when the virtual reality device receives the fourth stepping signal within previous reaction time and receives the third stepping signal within next reaction time in the backward walking mode, the virtual reality device displays the user continuing walking backward along a line of sight in the virtual environment according to a line of sight of the virtual environment and the backward walking mode.

22. The system for navigating the virtual environment using seated walking-in-place footstep locomotion according to claim 20, wherein when the virtual reality device receives the third stepping signal within previous reaction time and continues to receive the third stepping signal within next reaction time in the backward walking mode or when the virtual reality device receives the fourth stepping signal within previous reaction time and continues to receive the fourth stepping signal within next reaction time in the backward walking mode, the virtual reality device returns to the second pending state.

23. The system for navigating the virtual environment using seated walking-in-place footstep locomotion according to claim 20, wherein when the virtual reality device receives the third stepping signal in the idle state to enter the second pending state and receives the third stepping signal within the reaction time, the virtual locomotion mode in the virtual environment is a first side stepping mode and the virtual reality device displays the user walking toward a first side stepping direction from a line of sight in place in the virtual environment according to a line of sight of the virtual environment and the first side stepping mode.

24. The system for navigating the virtual environment using seated walking-in-place footstep locomotion according to claim 23, wherein when the virtual reality device continues receiving the third stepping signal within next reaction time in the first side stepping mode, the virtual reality device displays the user walking toward the first side stepping direction from a line of sight in place in the virtual environment according to a line of sight of the virtual environment and the first side stepping mode.

25. The system for navigating the virtual environment using seated walking-in-place footstep locomotion according to claim 24, wherein when the virtual reality device receives the fourth stepping signal in the idle state to enter the second pending state and receives the fourth stepping signal within the reaction time, the virtual locomotion mode in the virtual environment is a second side stepping mode whose stepping direction is opposite to a stepping direction of the first side stepping mode and the virtual reality device displays the user walking toward a second side stepping direction from a line of sight in place in the virtual environment according to a line of sight of the virtual environment and the second side stepping mode.

26. The system for navigating the virtual environment using seated walking-in-place footstep locomotion according to claim 25, wherein when the virtual reality device continues receiving the fourth stepping signal within next reaction time in the second side stepping mode, the virtual reality device displays the user walking toward the second side stepping direction from a line of sight in place in the virtual environment according to a line of sight of the virtual environment and the second side stepping mode.

27. The system for navigating the virtual environment using seated walking-in-place footstep locomotion according to claim 25, wherein when the virtual reality device receives the fourth stepping signal within next reaction time in the first side stepping mode or receives the third stepping signal within next reaction time in the second side stepping mode, the virtual reality device returns to the second pending state.

28. The system for navigating the virtual environment using seated walking-in-place footstep locomotion according to claim 18, wherein when the virtual reality device receives the third stepping signal or the fourth stepping signal within next reaction time in the first pending state or receives the first stepping signal or the second stepping signal within next reaction time in the second pending state, the virtual reality device switches to the idle state.

29. The system for navigating the virtual environment using seated walking-in-place footstep locomotion according to claim 18, wherein when the virtual reality device receives the third stepping signal or the fourth stepping signal within the reaction time in the forward walking mode, the first turning-in-place mode, or the second turning-in-place mode, the virtual reality device returns to the idle state.

30. The system for navigating the virtual environment using seated walking-in-place footstep locomotion according to claim 25, wherein when the virtual reality device receives the first stepping signal or the second stepping signal within the reaction time in the backward walking mode, the first side stepping mode, or the second side stepping mode, the virtual reality device returns to the idle state.

31. The system for navigating the virtual environment using seated walking-in-place footstep locomotion according to claim 18, wherein when the virtual reality device receives the third stepping signal or the fourth stepping signal within next reaction time in the first pending state, the virtual reality device switches to the second pending state; and when the virtual reality device receives the first stepping signal or the second stepping signal within next reaction time in the second pending state, the virtual reality device switches to the first pending state.

* * * * *